Figure 1:
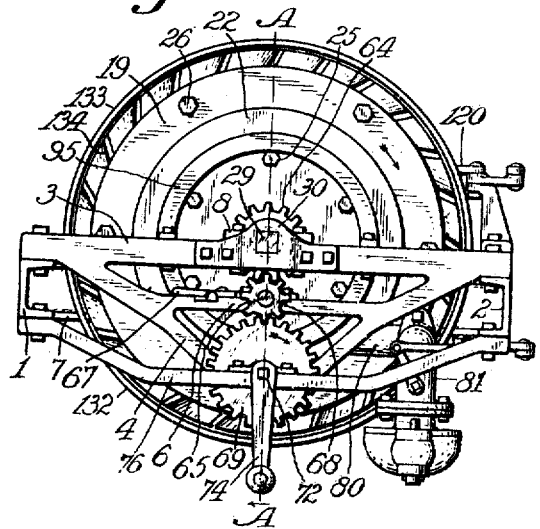

J. H. RICHARDS.
ROTARY ENGINE.
APPLICATION FILED MAR. 16, 1914.

1,209,204.

Patented Dec. 19, 1916.
5 SHEETS—SHEET 1.

WITNESSES:
J. H. Gardner
W. E. Snarrow

INVENTOR:
James H. Richards,
BY
E. T. Silvius
ATTORNEY

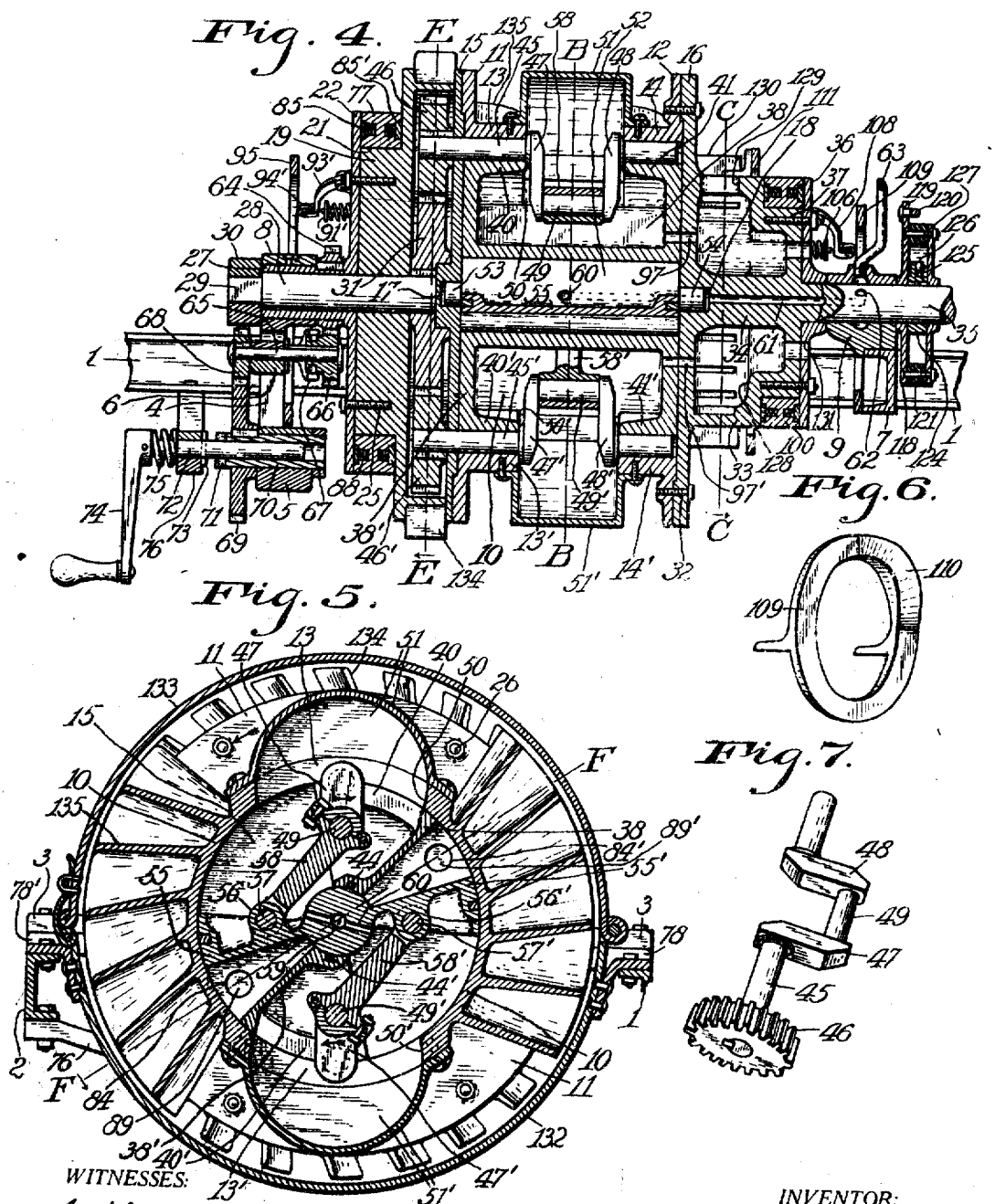

J. H. RICHARDS.
ROTARY ENGINE.
APPLICATION FILED MAR. 16, 1914.

1,209,204.

Patented Dec. 19, 1916.
5 SHEETS—SHEET 3.

WITNESSES:
J. H. Gardner
M. E. Sparrow

INVENTOR:
James H. Richards,
BY
E. T. Silvius,
ATTORNEY.

J. H. RICHARDS.
ROTARY ENGINE.
APPLICATION FILED MAR. 16, 1914.

1,209,204.

Patented Dec. 19, 1916.
5 SHEETS—SHEET 4.

WITNESSES:
J. H. Gardner
M. E. Sparrow

INVENTOR:
James H. Richards,
BY
E. T. Silvius,
ATTORNEY.

J. H. RICHARDS.
ROTARY ENGINE.
APPLICATION FILED MAR. 16, 1914.
1,209,204.
Patented Dec. 19, 1916.
5 SHEETS—SHEET 5.
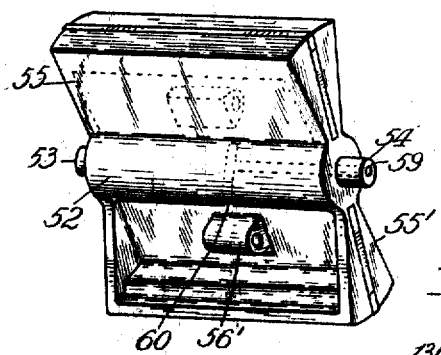
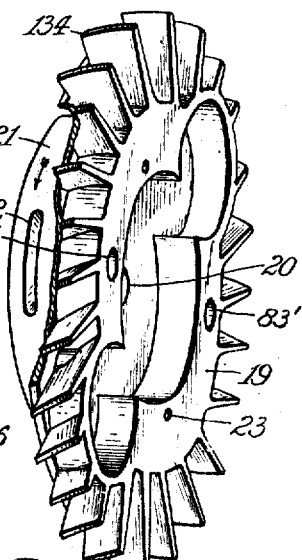
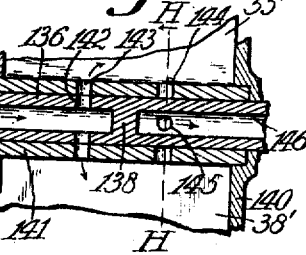
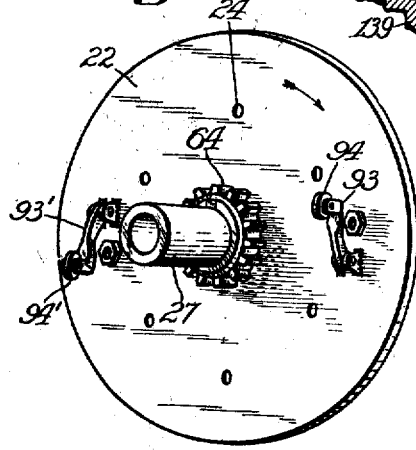
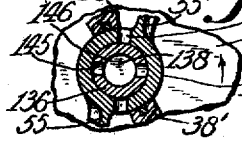
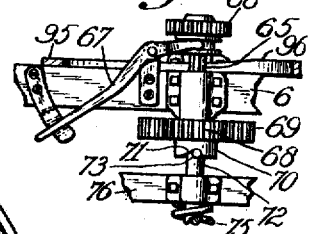
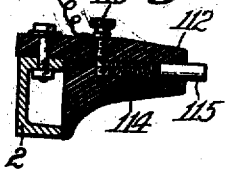
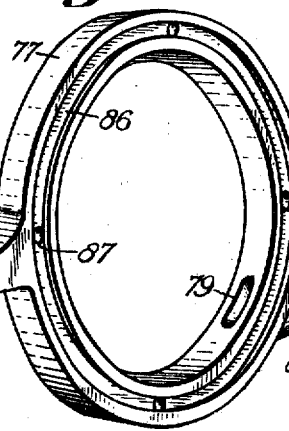
WITNESSES:
J. H. Garaner,
M. E. Sparrow
INVENTOR:
James H. Richards,
BY
E. T. Silvius,
ATTORNEY.

UNITED STATES PATENT OFFICE.

JAMES H. RICHARDS, OF MOSCOW, IDAHO.

ROTARY ENGINE.

1,209,204.

Specification of Letters Patent.

Patented Dec. 19, 1916.

Application filed March 16, 1914. Serial No. 825,097.

*To all whom it may concern:*

Be it known that I, JAMES H. RICHARDS, a subject of the King of Great Britain, residing at Moscow, in the county of Latah and State of Idaho, United States of America, have invented a new and useful Rotary Engine, of which the following is a specification, reference being had to the accompanying drawings and to the letters and figures of reference marked thereon.

The invention relates to a type of engine that is designed to be operated by the use of explosive mixture and to be slightly modified so that either steam or compressed air may be used as the motive force, the invention having reference more particularly to a rotary engine in which the motive force shall act entirely on live or active power-transmitting elements, the engine being of the type in which the principal portion of the structure necessarily required is utilized in lieu of a separate fly-wheel.

An object of the invention is to provide an engine of such construction as to combine the recognized advantageous features of both the rotary and the reciprocatory type of engine in the generation and transmission of power.

Another object of the invention is to provide a rotary engine that shall be compact and of relatively light weight per horse power, and capable of producing the maximum efficiency per unit of fuel consumed, to the end that economy in construction and operation may be attained.

A further object of the invention is to provide a rotary engine of such construction as to be adapted to be operated efficiently at moderate or relatively low speed, and which shall have relatively few wearing parts, so that the loss of power due to friction shall be reduced to the minimum, the wearing parts being enabled to perform their functions to the maximum and thus reduce the cost of repairs to the minimum extent.

A still further object is to provide a rotary engine of such construction that the motive force shall be effective in at least two directions or through two power generating mediums in order to obtain the greatest degree of energy from the motive force, and which engine shall be conveniently balanced on its axis of rotation.

A still further object of the invention is to provide improved means for cooling rotary explosion engines by utilizing the atmospheric air.

With the above mentioned and other objects in view, the invention consists in a rotary engine comprising a hollow power cylinder in which is a novel reciprocatory piston and also a head opposed to the piston so that motive force may be applied to move the piston and the cylinder, a crank shaft supported so as to be parallel to the axis of the cylinder, a pitman connected to the piston and the crank shaft, and gearing connected with the crank shaft for the generation and transmission of power, the engine comprising also novel valves and controlling apparatus therefor and also novel ignition apparatus.

The invention also consists further in the novel parts and in the combinations and arrangements of parts as hereinafter particularly described and further defined in the accompanying claims.

Figure 2:
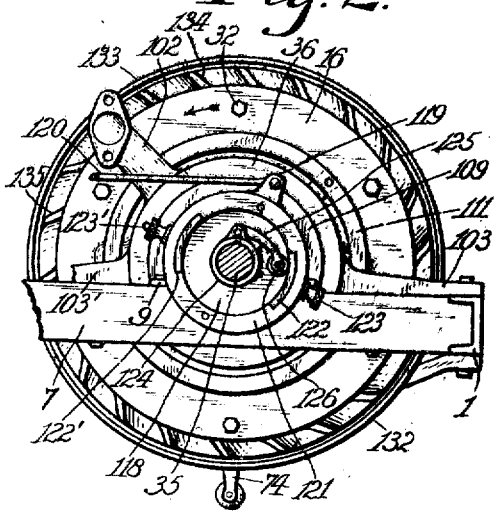
Figure 3:
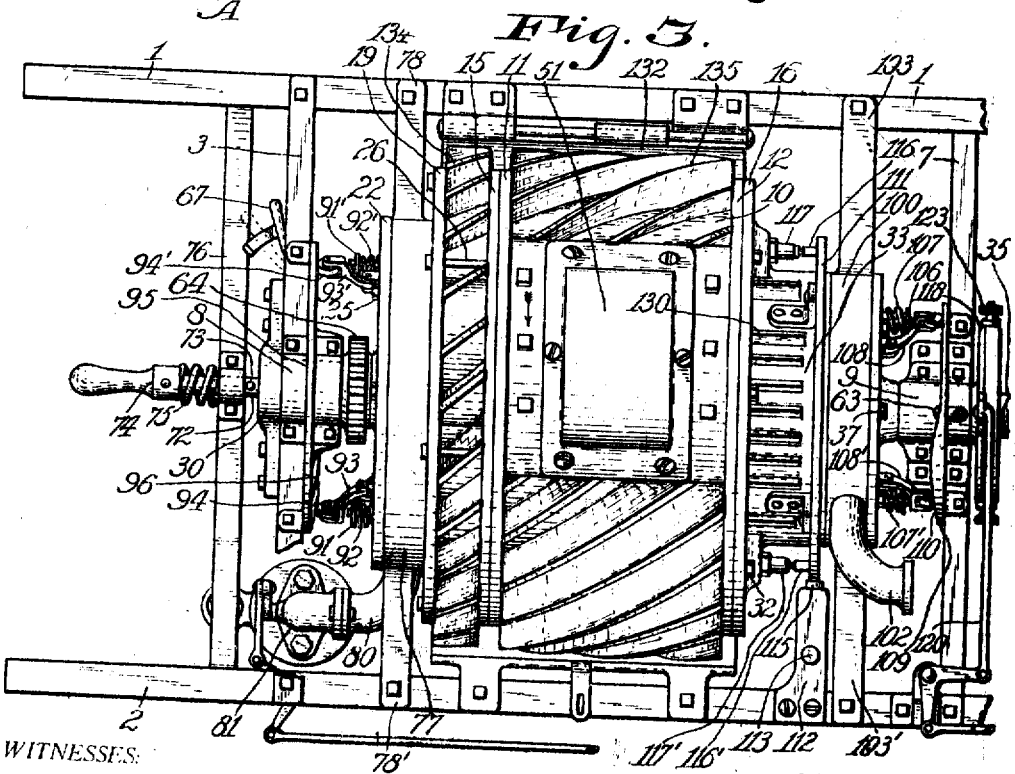
Figure 8:
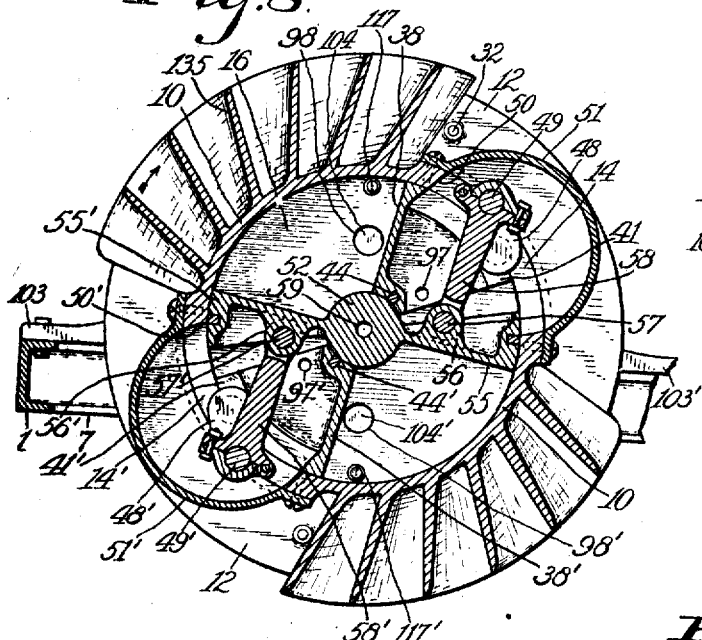
Figure 9:
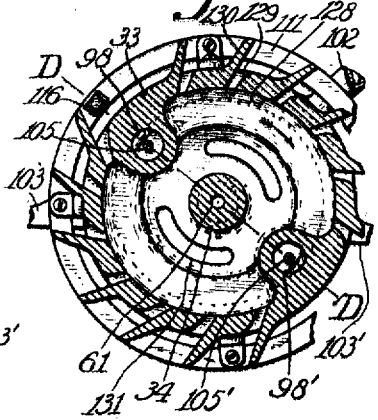
Figure 10:
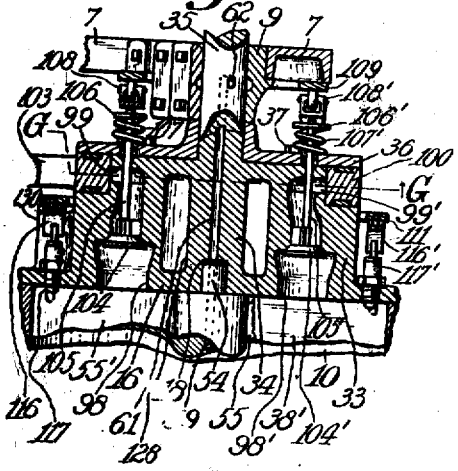
Figure 11:
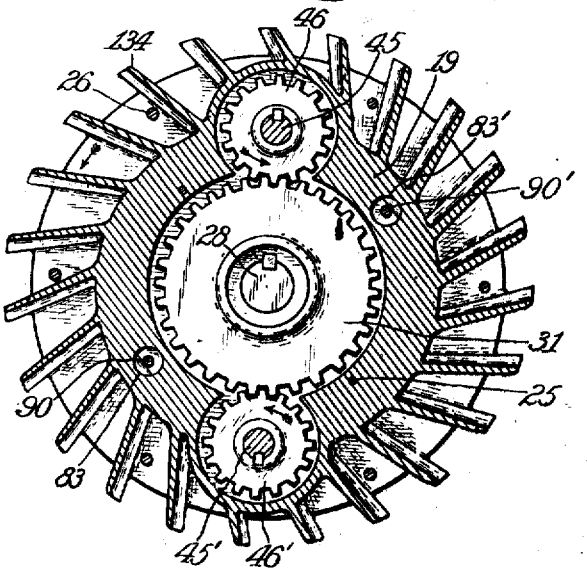
Figure 12:
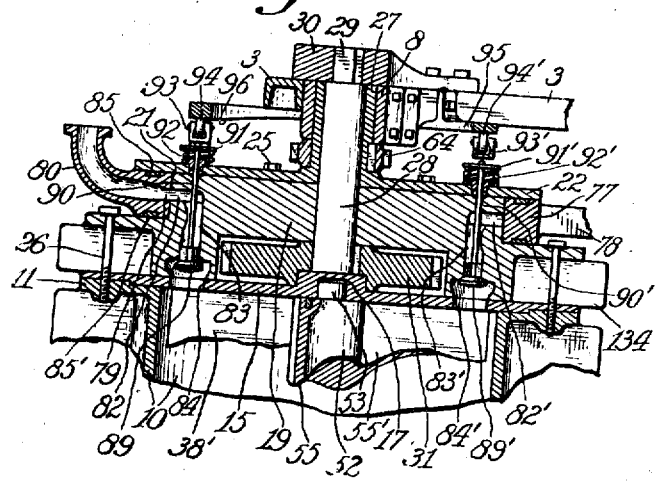
Figure 13:
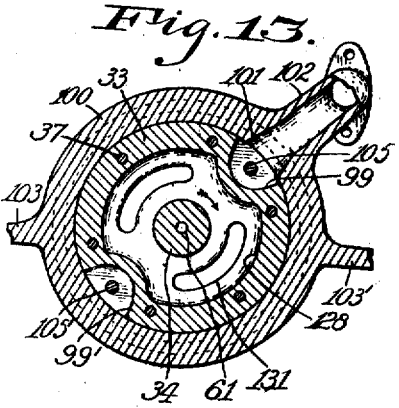
Figure 14:
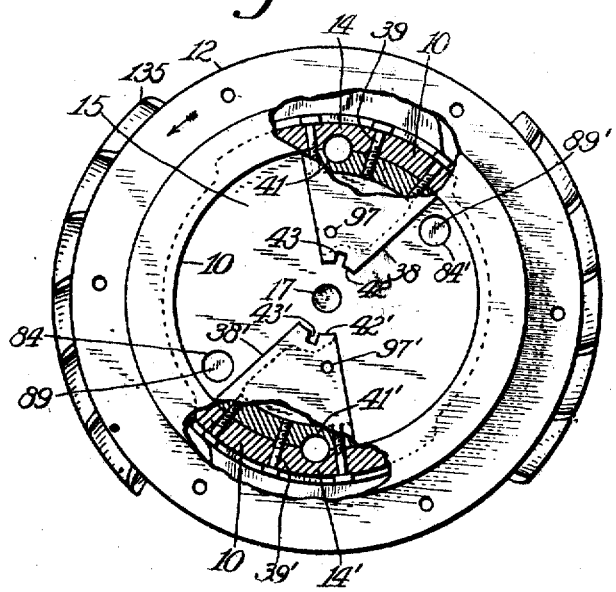
Figure 15:
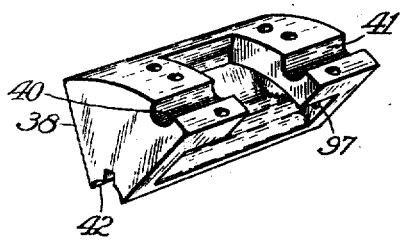
Figure 16:
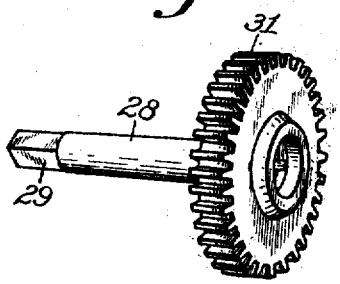

Referring to the drawings, Figure 1 is a front elevation of the improved engine constructed as an internal combustion engine; Fig. 2, a rear elevation of the engine partially broken away; Fig. 3, a top plan partially broken away, the upper portion of the casing comprised in the air-cooling system being omitted; Fig. 4, a longitudinal section approximately on the plane of the line A A in Fig. 1, the casing being omitted; Fig. 5, a transverse section approximately on the line B B in Fig. 4 looking toward the front end, the casing being included; Fig. 6, a perspective view of one of the valve-operating devices; Fig. 7, a perspective view of the crank shaft and pinion or gear wheel thereon; Fig. 8, a transverse section partially broken away on the line B B looking toward the rear end of the engine, parts thereof being in different positions than in Figs. 4 and 5; Fig. 9, a fragmentary section on the line C C in Fig. 4; Fig. 10, a fragmentary section approximately on the plane of the line D D in Fig. 9; Fig. 11, a section on the line E E in Fig. 4; Fig. 12, a fragmentary section of the engine approximately on the plane of the line F F in Fig. 5; Fig. 13, a fragmentary section on the line G G in Fig. 10; Fig. 14, an end elevation of the cylinder of the engine, partially broken away, looking at the rear end thereof, the rear end wall being omitted; Fig. 15, a perspective view of one of the cylinder heads or abutments on which the motive force acts for the generation of power; Fig. 16, a perspective view of the main gear wheel and its axial shaft; Fig. 17, a perspective view of the two pistons with which the engine preferably is provided; Fig. 18, a perspective view, partially broken away, of a combined inlet valve and gear housing; Fig. 19, a fragmentary section showing slight modifications to illustrate the adaptability of the engine to be actuated by means of steam or by compressed air; Fig. 20, a perspective view of one of the parts of the combined valve and gear housing; Fig. 21, a fragmentary section on the line H H in Fig. 19; Fig. 22, a fragmentary top plan of an engine starter adapted for use in connection with the improved engine; Fig. 23, a perspective view of one of the fluid-controlling valve chests with which the engine preferably is provided, and Fig. 24 is a sectional view of a device preferably employed in connection with the ignition system.

Similar reference characters throughout the various figures of the drawings indicate corresponding elements or features of construction herein referred to in detail.

The improved engine, which is illustrated for the purpose of a full and clear description thereof as adapted more particularly as an automobile engine or motor, comprises a suitable frame which in the present case may include two side bars 1 and 2 to which a suitable transverse head beam 3 is secured, the latter supporting a hanger 4 preferably provided with a bearing box 5 and also a shaft bearing 6 above the box 5 for conveniently supporting an engine starter. The frame also conveniently includes a tail beam 7 secured to the bars 1 and 2. The head beam is provided with a journal box 8, the tail beam being provided with a journal box 9.

A novel form of cylinder comprises a cylindrical wall 10 having external flanges 11 and 12 on its opposite ends respectively. One portion of the cylindrical wall is adapted to and constitutes journal bearing members 13 and 14, the opposite portion of the wall being formed so as to constitute journal bearing members 13' and 14', the bearing members being relatively near the ends of the cylinder. The cylinder is provided on its opposite ends with end walls 15 and 16 respectively so as to form an inclosure, the end walls being approximately disk-shaped. The inner side of the head end wall 15 has a centrally arranged journal bearing 17 therein, the rear end wall 16 having a similar journal bearing 18 therein. The head or front end wall 15 is provided with a combined gear housing and valve 19 which preferably is cast or formed separately and secured to the wall, and it has a central bore 20 therein adapted to receive a supporting shaft. The housing and valve comprises a portion 21 that is externally cylindrical and adapted to constitute a valve element and to which a disk-shaped front plate 22 is secured rather than being formed integrally therewith, suitable bolt holes 23 and 24 being provided to receive securing bolts 25, 26, whereby the combined gear housing and valve are fixedly secured to the end wall 15 and also to the plate 22. The front plate of the combined housing and valve is provided with a hollow journal 27 that is rotatably mounted in the journal box 8, an axial shaft 28 being provided which has a squared portion 29 that is secured against rotation in a holding block 30 which is fixedly secured to the beam 3, the shaft extending through the journal 27 to the end wall 15 of the cylinder, the shaft constituting the axis of rotation of the cylinder, so that the combined housing and valve and also the journal 27 rotate in operation on the shaft. The combined housing and valve is suitably recessed or chambered and receives a main gear wheel 31 which is fixedly secured to the inner end of the shaft 28 whereby the wheel is supported stationarily at the outer side of the end wall 15. The rear end wall 16 preferably is removably secured to the flange 12 by means of bolts 32 and it has a cylindrical exhaust-controlling member 33 thereon which is adapted to assist in cooling the adjacent walls, as will further appear, the member having a central hub 34 therein from which extends a supporting journal 35 that is rotatably mounted in the journal box 9. The member 33 preferably is provided with a separate end portion or plate 36 that is removably secured thereto by means of bolts 37.

The power cylinder includes also two identically formed members which constitute heads 38 and 38' preferably formed separately and secured to opposite portions of the inner side of the cylinder wall by means of bolts 39 and 39', the heads having relatively broad bases and with another element hereinafter described form partitions to divide the interior of the cylinder into two chambers, the heads extending toward the axis of rotation of the cylinder. The head 38 is adapted to and constitutes two shaft bearing members 40 and 41 which are mated to the members 13 and 14 respectively, the head 38' having similar bearing members 40' and 41' mated to the members 13' and 14' respectively. The inner ends of the heads have concave bearing faces 42 and 42' in which are packing grooves 43 and 43' respectively, packing strips 44 and 44' being arranged in the grooves respectively, each strip being opposite to the other. Two crank shafts 45 and 45' are rotatably mounted in the bearing members formed by the cylinder wall and the heads and they extend through the front end wall 15 of the cylinder and into suitable recesses or oil-retaining chambers in the housing-member 19, two pinions or gear wheels 46 and 46' being fixed on the two shafts respectively and in mesh with the main gear wheel 31, so that while the pinions are rotated they travel about the main gear wheel and consequently cause rotation of the power cylinder, from which motion may be transmitted by various means, as by connecting a shaft, a pulley, or a gear wheel to the journal 35 which extends beyond its journal box so as to constitute a driving shaft. The shaft 45 has two crank arms 47 and 48 and a crank pin 49, the shaft 45' similarly having two arms 47' and 48' and a crank pin 49'. The cylinder wall has suitable openings 50 and 50' adapted to permit the operation of the cranks of the respective shafts, one of the openings communicating with one of the chambers, the other opening being in communication with the remaining one of the chambers, and the openings are covered by means of caps 51 and 51' respectively, which with the chambers form crank boxes.

An axial shaft or hub 52 is provided that is cylindrical and extends from the end wall 15 to the wall 16 and has trunnions 53 and 54 on opposite ends respectively that are journaled in the bearings 17 and 18 respectively, two pistons 55 and 55' being fixed on the shaft 52, the shaft being practically in contact with the bearing faces 42 and 42' of the cylinder heads, so that the pistons are in different chambers of the cylinder. One piston is provided with a lug 56, the other with a lug 56', the lugs being provided respectively with wrist pins 57 and 57'. A pitman 58 is connected to the crank pin 49 and to the wrist pin 57, a similar pitman 58' being connected to the crank pin 49' and also to the wrist pin 57'. The shaft 52 preferably has a longitudinal duct 59 therein extending through the trunnion 54 and connected with a transverse duct 60 for conveying oil into the two chambers of the cylinder. The hub 34 has a longitudinal duct 61 therein extending from the journal bearing 18 and into the journal 35 and is connected with a lateral duct 62 extending to the surface of the journal so as to receive oil from a pipe 63 connected to the top of the journal box 9.

In order to be enabled to start the engine the hollow journal 27 is provided with a gear wheel 64, and a countershaft 65 is rotatably mounted on the bearing 6 and has a gear wheel 66 splined thereon, the wheel being provided with a controlling lever 67 for moving the wheel into or out of contact with the wheel 64. The countershaft has also a gear wheel 68 fixed thereon that is engaged by a gear wheel 69 which is fixed to a hollow shaft 70 rotatably mounted in the bearing 5, the outer end of the hollow shaft having clutch teeth 71 thereon. A crank shaft 72 is movably arranged in the shaft 70 and provided with clutch teeth 73 adapted to engage the teeth 71 when the shaft is pushed inward, the outer end of the shaft 72 being provided with a crank 74, there being a spring 75 on the shaft that is seated against a bearing bar 76 which is secured to the frame bars 1 and 2 and assists in rotatably supporting the shaft 72 which is yieldingly pushed outward by the spring. The engine starter obviously may be varied as to details and relative arrangement of parts as may be desired.

In order to control the admission of explosive mixture to the power cylinder, an annular valve chest 77 is provided which extends about the valve portion 21 and has supporting arms 78 and 78' that are secured to the frame bars 1 and 2 respectively, so as to be fixedly supported and permit the valve portion to rotate in the chest, the latter having an inlet port 79 therein to which an inlet pipe 80 is connected, a suitable carbureter or fuel mixer 81 being connected to the pipe. The valve portion 21 has two ports 82 and 82' in its peripheral portion from which extend port portions 83 and 83' having orifices 84 and 84' respectively in the end wall 15 of the cylinder, there being an orifice in each of the two chambers of the cylinder. When the cylinder rotates each port 82 and 82' in succession forms communication between the port 79 and the cylinder. The valve chest is arranged between the plate 22 and a suitable guide face formed on the housing and valve member 19 and is provided with packing rings 85 and 85' in opposite sides respectively, the sides having recesses 86 therein receiving the packing rings, the recesses having sockets 87 therein receiving springs 88 for yieldingly pressing the packing rings outward so as to prevent the escape of fuel or motive fluid. In some cases controlling valves 89 and 89' are suitably seated in the port portions 83 and 83' and provided with operating stems 90 and 90' respectively that extend forward through the member 19 and out through the plate 22, the stems being provided with heads 91 and 91' against which springs 92 and 92' are seated, the springs being seated also on the plate 22 and normally holding the valves yieldingly to their seats. Two arms 93 and 93' are pivotally connected to the plate 22 and extend against the outer ends of the valve stems, the arms preferably being provided with rollers 94 and 94' that are in contact with a circular track 95 having a cam or protruding portion 96 which when the roller passes over it causes the valve to be opened or unseated, the track being fixedly supported on the beam 3.

Preferably the chambers of the power cylinder are vented so as to prevent excessive back pressure or vacuum in the chambers, the venting being accomplished by means of vent-holes 97 and 97′ in the end wall 16, or otherwise as may be desired. The end wall 16 has exhaust ports 98 and 98′ therein that extend toward the end plate 36 and have lateral ports 99 and 99′ that extend therefrom to a cylindrical peripheral portion of the member 33 about which extends an annular valve chest 100 having a port 101 therein to which the ports 99 and 99′ are successively brought into communication in operation, an exhaust pipe 102 being connected with the port 101, the valve chest having supporting arms 103 and 103′ that are secured to the frame bars 1 and 2. The valve chest 100 is similar to the chest 77, but preferably is smaller in diameter and is arranged between the plate 36 and a suitable guide face formed on the member 33. Preferably in some cases two valves 104 and 104′ are seated in the ports 98 and 98′ and have stems 105 and 105′ extending through the plate 36, the stems being provided with heads 106, 106′, and seating springs 107, 107′; operating arms 108 and 108′ being pivotally connected to the plate 36 so as to extend against the outer ends of the valve stems and to a circular track 109 fixedly secured to the beam 7, the track having a cam or protruding portion 110 for causing the valves to be periodically unseated.

For the purpose of igniting the fuel charges in the cylinder, an electrical distributing ring 111 is fixedly mounted on and extends about the member 33, an insulating block 112 is secured to the frame bar 2 and provided with a binding screw 113 extending into a suitable socket in which a coil spring 114 is arranged in contact with the screw, a contact rod 115 being movably arranged in the socket in contact with the spring and thereby pressed against the periphery of the ring 111. The ring 111 is provided with electrical connectors 116, 116′, with which spark-plug 117, 117′, are detachably connected, the plug being inserted in the end wall 16 of the cylinder, there being a plug in each of the two chambers or compartments, preferably in proximity to the exhaust ports 98 and 98′ respectively. It will be understood that a circuit wire is to be connected to the binding screw 113. Timing apparatus for the explosions may suitably comprise a disk 118 rotatably mounted on the shaft 35 and having an arm 119 thereon provided with a controlling rod 120, an insulating ring 121 being secured to the disk and provided with contact plates 122 and 122′ and also binding screws 123 and 123′ connected with the plates as is customary, a collar 124 being secured to the shaft 35 and to which an arm 125 is pivotally connected and provided with a roller 126 to roll on the inner side of the insulating ring and across the contact plates for periodically making electrical connection between the binding screws and the shaft, and consequently the engine structure, it being understood that circuit wires will be connected with the binding screws, so that sparking at the spark-plugs shall periodically occur. The devices may, if desired, have a cover plate 127 secured to the insulating ring.

The air-cooling system preferably includes a chamber 128 formed in the member 33, the peripheral wall of the chamber having slots or apertures 129 therein at the rear side of which blades 130 project from the wall, the slots and the blades being arranged at oblique angles to the radial so that in operation the blades cause the atmospheric air to be drawn through the slots to the chamber, the chamber extending to the walls of the exhaust ports and to the end wall 16, the end portion 36 of the member 33 having outlet openings 131 for the escape of the air from the chamber to the atmosphere so that forced circulation through the chamber is assured. A suitable casing extends about the power cylinder and its gear housing, and preferably comprises an end part 132 supported by the frame bars 1 and 2 and a top part 133 suitably connected to the end part. The gear housing 19 is provided with spirally arranged blades 134 that extend outward nearly to the casing, the cylinder being provided with spirally arranged blades 135, the blades projecting beyond the flanges of the cylinder so that in operation the atmospheric air is forcibly drawn through the casing for cooling or preventing excessive heating of the cylinder and various parts subjected to the heat of the motive fluid.

It should be understood that the valve means for controlling the admission and exhaust of the motive fluid to and from the cylinder may be variously modified, an example of which is illustrated in Figs. 19 and 21, in which a shaft 136 is provided in lieu of the shaft 52 and has a longitudinal duct 137 therein for receiving the fluid, the duct terminating at a partition wall 138 in the shaft, the main gear wheel 31 being secured to the shaft. The pistons 55 and 55′ are arranged between cylinder end walls 139 and 140 adapted to take the place of the walls 15 and 16 respectively, the pistons being fixed on a hollow shaft 141 journaled on the shaft 136 which has lateral ports 142 communicating with the port 137 so that the fuel or motive fluid may pass into the cylinder chambers through ports 143 formed in the hub 141, the hub having also exhaust ports 144 through which the exhaust gases may escape when moved into communication with a port 145 formed in the wall of the shaft 136 so as to communicate with a longitudinal duct 146 formed also in the shaft. The heads 38 and 38' in the cylinder are adapted to have contact with the hollow shaft 141.

It should be understood that, when desired to construct the engine so that it may be operated by means of steam or by compressed air, the apparatus comprising the cooling system, and also the apparatus comprising the ignition system, will be omitted as will also the engine starting apparatus, the engine being variously modified as to detail so as to adapt it for the use of steam or compressed air as may be desired. Also various modifications may be made as to various details and the relative arrangement of parts, as for instance the power cylinder may be stationarily supported and the shaft 28 be permitted to rotate, all within scope of the appended claims.

In practical use, in operating the engine by means of explosive mixture, the engine may be started by means of the engine starter shown, the operation of which will be obvious, or by other means if preferred. The explosive mixture is admitted by the valve means described through the orifices 84 and 84' separately at the proper periods controlled by the relative arrangement of the ports 82 and 82', or the cam or protruding portion 96, as may be prearranged. With the pistons approximately in the positions shown in Fig. 5, the explosive mixture is under compression and ignition occurs with the result that the piston acted upon and the opposite cylinder head are forced apart, so that the head directly imparts the force of the impulse to rotate the cylinder while the pistons cause rotation of the crank shafts 45 and 45', and consequently the pinions 46 and 46' which transmit the force exerted on the pistons to the main gear wheel 31 assist in causing the rotation of the cylinder, the full extent of the energy expended being thus utilized in producing the required power. The revolving cylinder structure obviously acts as a fly-wheel. In Fig. 8, the approximate relative positions of the pistons and the cylinder heads after explosion are seen. When at rest, the lubricating oil obviously gravitates to the lowest point, but in operation is thrown about so as to lubricate the various movable parts and by reason of centrifugal force is thrown out into the caps 51 and 51' to be taken up by the cranks and thrown about onto the moving parts. Other results of operation of the various elements will be readily understood from the detail description of the construction and function thereof without further repetitious explanation.

Having thus described the invention, what is claimed as new is—

1. An engine including a hollow cylindrical wall having journal bearings, end walls secured to the cylindrical wall, a shaft rotatably guided in the end walls, a head secured to the cylindrical wall and having sliding contact with the shaft, a piston fixed on the shaft, a crank shaft mounted in the bearings of the cylindrical wall, and a pitman connected to the piston and the crank shaft.

2. An engine including a hollow cylinder, two end walls fixedly secured to the cylinder and having each a journal bearing in the inner portion thereof, an axial shaft having two trunnions rotatably mounted in the bearings respectively, a piston fixed to the shaft, a head fixed to the cylinder, a crank shaft mounted on the cylinder, and a pitman connected to the piston and the crank shaft.

3. An engine including a cylindrical wall having journal bearings, two end walls secured to the cylindrical wall and having each a shaft bearing in the inner portion thereof, an axial shaft rotatably guided in the shaft bearings, a head secured to the cylindrical wall and having journal bearings, a crank shaft mounted in the journal bearings of the cylindrical wall and the head, a piston fixed on the axial shaft, and a pitman connected to the piston and the crank shaft.

4. An engine including a hollow cylinder, two end walls secured to the opposite ends respectively of the cylinder and provided with supporting devices, one of the end walls having a gear housing fixed thereon, an axial shaft rotatably supported in the cylinder by the supporting devices, a piston fixed on the shaft, a head secured to the wall of the cylinder and extending to the shaft, a crank shaft rotatably supported by the wall of the hollow cylinder between the end walls and extending into the gear housing, a pinion in the housing and fixed to the crank shaft, a gear wheel mounted in the housing and in mesh with the pinion, and a pitman connected to the piston and the crank shaft.

5. An engine including a cylinder having a chamber therein, the cylindrical wall of the cylinder having an opening therein in communication with the chamber and a cap covering the opening, a crank shaft rotatably mounted in the opening to operate adjacent the cap, a piston movable in the chamber of the cylinder, and a pitman connected to the crank shaft and the piston.

6. An engine including a cylinder having a plurality of chambers therein, the cylindrical wall of the cylinder having a plurality of outwardly offset portions forming a portion of the respective chambers, the wall having also two series of blades on the outer side thereof between the offset portions, the blades being spirally inclined, a plurality of crank shafts mounted in the cylindrical wall to operate in the chambers respectively, a plurality of pistons movable in the chambers respectively, and a plurality of pitmen in the chambers respectively and connected to the piston and the crank shaft therein.

7. An engine including a rotatably supported gear housing having an oil-retaining chamber therein, the housing having a fuel inlet port therein, a cylinder fixedly secured at one end to the housing and having an explosion chamber in communication with the port, a gear wheel in the oil-retaining chamber and fixedly supported to permit rotation of the housing, a head fixed in the explosion chamber, a piston movable in the explosion chamber, a crank shaft rotatably mounted in the cylinder and extending into the oil-retaining chamber, a pitman connected to the piston and the crank shaft, and a pinion fixed on the crank shaft in the oil-retaining chamber in mesh with the gear wheel.

8. An engine including a hollow cylinder having two shaft bearings on the wall thereof, a head fixed in the cylinder and having two shaft bearings mated to the shaft bearings of the cylinder, a crank shaft rotatably mounted in all the bearings, a piston guided to oscillate in the cylinder opposite the head, a pitman connected to the crank shaft and the piston, and two end walls fixedly secured to opposite ends respectively of the cylinder, one of the end walls having an inlet port therein, the remaining end wall having an outlet port therein, the ports being adjacent to the head.

9. An engine including a cylindrical wall, two end walls fixedly secured to the opposite ends respectively of the cylindrical wall, the central portion of each end wall having a journal bearing in the inner side thereof, a shaft rotatively journaled in the bearings, a piston fixed on the shaft and movable within the confines of the cylindrical wall and the end walls, a head fixed to and extending from the cylindrical wall and to the shaft, a crank shaft rotatably mounted jointly in the head and the cylindrical wall, and a pitman connected to the piston and the crank shaft.

10. An engine including a stationary shaft, a hollow cylinder having a gear housing fixed thereon provided with an oil-retaining chamber adjacent to the cylinder, the housing being rotatable on the stationary shaft, a gear wheel in the chamber of the housing and fixed therein to the stationary shaft, means for rotatably supporting the housing independently of the shaft, a crank shaft rotatably mounted on the cylinder and extending into the chamber and opposite the periphery of the gear wheel to be carried by the cylinder about the wheel, a pinion inclosed in the chamber and fixed on the crank shaft and in mesh with the gear wheel, a piston movable in the cylinder, and a pitman connected to the crank shaft and the piston.

11. An engine including a cylinder, two end walls secured to the opposite ends respectively of the cylinder and provided with means for rotatably supporting the cylinder, one of the end walls having a gear housing fixed thereon provided externally with spirally arranged blades, a casing fixedly supported and extending about the housing and the blades, a gear wheel in the housing fixedly supported, two pinions rotatably supported by the cylinder in mesh with the gear wheel to be guided about the wheel, and movable means in the cylinder for rotating the pinions to rotate the cylinder by means of the gear wheel.

12. A rotary engine including two annular valve chests fixedly supported and having each a port therein, a cylinder provided with two valve members fixed thereon and rotatable in the valve chests respectively, each member having a port therein extending to the interior of the cylinder and to be moved to communication with the port of the chest, means for rotatably guiding the cylinder independently of the chests, a fixedly supported gear wheel, crank shafts rotatably mounted on the cylinder and having each a pinion fixed thereon in engagement with the gear wheel, heads fixed in the cylinder, pistons movably guided in the cylinder, and pitmen connected to the crank shafts and the pistons.

13. In a rotary engine, the combination with a frame, and a gear wheel fixedly supported by means of the frame, of a cylinder having two end walls that are rotatably supported by means of the frame, one of the end walls being provided with a valve member having an exhaust port therein, the wall being provided also with a spark plug, a head fixed in the cylinder, a piston movably guided in the cylinder, a crank shaft rotatably mounted in the cylinder, a pitman connected to the piston and the crank shaft, a pinion fixed on the crank shaft in mesh with the gear wheel, an electrical conducting ring fixed to and extending about said valve member and electrically connected with said plug, an insulating block secured to the frame, and an electrical contact device supported by the insulating block and having connection with said ring.

14. In a rotary engine, the combination of an explosion cylinder rotatably supported and provided on one end thereof with an apertured cooling chamber, an exhaust passage leading from the cylinder and through the chamber, an exhaust valve movably mounted in the passage, means adapted to be actuated by explosive force in the cylinder for rotating the cylinder, and means acting, on rotation of the cylinder, to force atmospheric air through the chamber for cooling said passage and said valve.

15. In a rotary engine, the combination of a cylinder, two end walls secured to opposite ends respectively of the cylinder, one of the walls having a supporting journal and a duct extending through the journal, a shaft guided in the end walls and having a duct therein extending longitudinally from one end thereof and also a port extending from the duct to the surface of the shaft within the cylinder, the duct of the shaft having connection with the duct of the wall, a piston movable in the cylinder and guided on the shaft, a head fixed in the cylinder opposite the piston, a crank shaft rotatably mounted jointly in the head and the cylinder, and a pitman connected to the piston and the crank shaft.

16. In a rotary engine, the combination with a frame, of an annular valve chest fixedly connected to the frame and having an inlet port therein, a cylinder having end walls, one of the walls being provided with a housing fixed thereto having a cylindrical valve portion that is rotatably mounted in the valve chest, said housing having a port therein to periodically form communication with the port in said chest and extending to the cylinder, a supporting device fixedly mounted on the frame and having a protuberance thereon, and a valve movably mounted in the port in said housing and constructed to be actuated by said protuberance when carried into contact therewith.

17. In an engine, the combination of a cylindrical wall having an opening therein, the wall having two bearing portions on opposite sides of the opening, two end walls secured to opposite ends of the cylindrical wall, a cylinder head fixedly secured to the inner side of the cylindrical wall adjacent the opening in contact with said end walls and having two bearing portions mating the bearing portions of the cylindrical wall, a crank shaft rotatably mounted in the bearing portions of said wall and said head, a piston movably guided within the confines of said walls, and a pitman connected to the piston and the crank of said crank shaft.

18. In a rotary engine, the combination of a cylinder, an end wall secured to one end of the cylinder and rotatably supported, an end wall secured to the opposite end of the cylinder and having a valve member thereon provided with a journal rotatably supported, said member having a chamber therein extending to the end wall, the end of the chamber being open to the atmosphere, the peripheral wall of said chamber having a plurality of slots therein and also a plurality of blades on one side of the slots respectively, the blades extending obliquely to the peripheral wall and partially over the slots, and means for rotating the cylinder.

19. In a rotary engine, the combination of a cylinder, an end wall secured to one end of the cylinder, an annular valve chest fixedly supported and having a port therein, and an end wall secured to the opposite end of the cylinder and having a cylindrical valve member thereon that is rotatable in said chest, said member having a port therein to periodically form communication with the port in said chest and extending through the end wall to the cylinder, with a crank shaft rotatably mounted on the cylinder, a piston in the cylinder operatively connected with the crank shaft, a fixed gear wheel, and a pinion fixed on the crank shaft in mesh with the gear wheel.

20. In a rotary engine, the combination of an explosion cylinder provided with journals rotatably supported, one end wall of the cylinder having a valve member thereon provided with a cooling chamber extending about the axis of rotation of the cylinder, the chamber having inlets and also outlets, said member having an exhaust port therein, the wall of the port being in said chamber, an exhaust valve movably seated in the port, a piston movable in the cylinder, a crank shaft rotatably mounted on the cylinder, a pitman connected to the piston and the crank shaft, a pinion fixed on the crank shaft, a gear wheel fixedly supported in mesh with the pinion, and means for forcing air into said inlets on rotation of the cylinder.

21. In a rotary engine, the combination of a cylinder comprising a cylindrical wall having two end walls secured thereto for rotatably supporting the cylinder, the cylindrical wall having journal bearings therein and having also a series of projecting spirally arranged blades fixed on the exterior thereof a plurality of heads fixedly secured in the cylinder and having journal bearings mated to the journal bearings of the cylindrical wall, pistons movably guided in the cylinder, crank shafts rotatably mounted in the bearings of the cylindrical wall and the heads, and pitmen connected to the pistons and the crank shafts respectively, with a casing extending continuously about the cylindrical wall adjacent to said blades.

22. In a rotary engine, the combination with a frame, of an annular valve chest fixedly supported by the frame and having a port therein, a cylinder having a head fixed therein, an end wall fixedly secured to one end of the cylinder in contact with the head and having a port therein adjacent the head, a gear housing fixedly secured to the end wall and having a cylindrical valve portion rotatable in the chest, said housing having a port therein extending from the port in said end wall for periodically forming communication with the port in said chest, an end wall secured to the opposite end of the cylinder in contact with said head, a piston movable in the cylinder, a crank shaft rotatably mounted on the cylinder, a pitman connected to the crank shaft and the piston, a pinion fixed on the crank shaft, and a gear wheel fixedly supported in mesh with the pinion.

23. In a rotary engine, the combination with a frame, and a gear wheel fixedly supported by the frame, of a cylinder having two end walls, one end wall being provided with a journal rotatably supported by the frame, the wall being provided also with means for admitting explosive mixture to the cylinder, the remaining wall being provided with a valve member having an exhaust port therein and provided also with a spark plug, a head fixed in the cylinder, a piston movably guided in the cylinder, a crank shaft rotatably mounted on the cylinder, a pitman connected to the piston and the crank shaft, a pinion fixed on the crank shaft in mesh with the gear wheel, an electrical conducting ring fixed to and extending about said valve member, said ring being connected to said plug, an insulating block secured to the frame, a binding screw connected to said block, and a contact device having conducting connection with said screw and said ring.

24. In a rotary engine, the combination with a frame, of a journal box fixedly secured to the frame, a cylinder having two end walls secured thereto, one of the end walls being provided with a journal that is rotatably supported by the frame, a gear housing fixedly secured to the remaining one of the end walls and having an oil-retaining chamber therein extending to the end wall, the housing being provided with a hollow journal rotatively mounted in the journal box, a stationary shaft fixedly secured to the frame and extending through the hollow journal and the housing, a gear wheel in the said chamber and fixedly secured to the stationary shaft, a driving shaft rotatively mounted on the cylinder and having a crank pin, the driving shaft extending into the said chamber, a pinion in said chamber in mesh with said gear wheel and fixed to said driving shaft, a piston movable in the cylinder, and a pitman connected to the crank pin and the piston.

25. In a rotary engine, the combination with a frame, of a cylinder having end walls, one end wall being provided with a journal rotatably supported by the frame, an annular valve chest fixedly connected to the frame and having an inlet port therein, a housing fixedly secured to the remaining one of the end walls and having a cylindrical valve portion rotatably mounted in the chest, said housing having a port therein to periodically form communication with the port in said chest and extending to the cylinder, packing rings for preventing escape of fluid from the interior of said chest, a circular track fixedly mounted on the frame and having a protuberance thereon, a valve movably mounted in the port in said housing and having a stem extending out beyond the housing, an arm pivoted to the housing and extending opposite the end of the stem to the track to be actuated by said protuberance for operating the valve, and power means for rotating the cylinder.

26. In a rotary engine, the combination with a frame, of an explosion cylinder rotatably mounted on the frame and including an end wall having a cylindrical valve member thereon extending along the axis of rotation of the cylinder, the member having a chamber therein extending from the end wall, the end wall of the chamber having an outlet aperture therein, said member having an exhaust port therein extending from the explosion cylinder, the wall of the port being in said chamber, the cylindrical wall of the valve member having apertures therein and also blades projecting from the rear side of the apertures for forcing atmospheric air into the apertures and through said chamber to cool said port wall, a piston movable in said cylinder adjacent said end wall, a crank shaft rotatably mounted on said cylinder, a pitman connected to the piston and the crank shaft, a pinion fixed on said crank shaft, and a gear wheel fixedly supported in mesh with said pinion.

27. In a rotary engine, the combination of a cylinder, an annular valve chest fixedly supported and having a port therein, an end wall secured to one end of the cylinder and having a cylindrical valve member thereon that is rotatable in said chest, said member having a port therein to periodically form communication with the port in said chest and extending through the end wall to the cylinder, an annular track fixedly supported and having a protuberance thereon, a valve seated to normally close the port and having a stem extending beyond said member, and an arm pivoted to said member and extending against the end of said stem and to said track to be periodically actuated by said protuberance for unseating said valve, with a spring for seating said valve, a head secured to the opposite end of the cylinder, a crank shaft rotatably mounted on the cylinder, a fixed gear wheel, a pinion fixed on the crank shaft in mesh with the gear wheel, and a piston in the cylinder operatively connected with the crank shaft.

28. In a rotary engine, the combination of a frame, a journal box secured to the frame, a cylindrical wall, two end walls secured to opposite ends of the cylindrical wall and having each a journal bearing in the inner side thereof, one of the end walls having a hub thereon and a journal extending from the hub, the journal being rotatably supported in the journal box, the hub and the journal bearing having a continuous oil-duct therein extending longitudinally to the adjacent journal bearing in the end wall, the journal having a lateral duct therein extending from the oil-duct to the interior of the journal box, the opposite one of the end walls being rotatably supported by the frame, two heads fixed to the cylindrical wall and extending each toward the other, a shaft rotatively supported in the journal bearings of the end walls and extending between said heads, said shaft having a longitudinal duct therein having communication with said oil-duct in said bearing, the shaft having also a transverse duct extending from the longitudinal duct therein to opposite portions of the exterior of the shaft, two pistons fixed on said shaft on opposite sides of said transverse duct, two crank shafts rotatably mounted on the cylindrical wall and connected respectively with the two pistons, two pinions fixed on the crank shafts respectively, and a gear wheel fixedly supported in mesh with the two pinions.

In testimony whereof, I affix my signature in presence of two witnesses.

JAMES H. RICHARDS.

Witnesses:
E. T. SILVIUS,
J. H. GARDNER.